United States Patent
Kellner et al.

(10) Patent No.: US 12,355,047 B2
(45) Date of Patent: Jul. 8, 2025

(54) BATTERY DEVICE FOR A MOTOR VEHICLE, MOTOR VEHICLE AND METHOD FOR OPERATING A BATTERY DEVICE

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE); Oliver Heeg, Schwieberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 593 days.

(21) Appl. No.: 17/706,898

(22) Filed: Mar. 29, 2022

(65) Prior Publication Data
US 2022/0336886 A1  Oct. 20, 2022

(30) Foreign Application Priority Data
Apr. 14, 2021  (DE) ................. 10 2021 109 353.8

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 10/6568; H01M 50/249; H01M 50/209; H01M 50/505
See application file for complete search history.

(56) References Cited

U.S. PATENT DOCUMENTS

2013/0025953 A1* 1/2013 Saeki ................. H01M 10/625
                                                          180/68.5
2013/0280566 A1  10/2013 Chung et al.
(Continued)

FOREIGN PATENT DOCUMENTS

CN         102544621 A      7/2012
CN         103168388 A      6/2013
(Continued)

OTHER PUBLICATIONS

JP2012129058A. Jul. 5, 2012. English machine translation by EPO. (Year: 2012).*
(Continued)

*Primary Examiner* — James Lee
(74) *Attorney, Agent, or Firm* — Buchanan Ingersoll & Rooney PC

(57) ABSTRACT

A battery device for a motor vehicle, having a first battery module with a first housing, a second battery module which is arranged next to the first battery module in a first direction (X) with a second housing, a coolant channel, and a battery module connector arranged in the coolant channel for electrically contacting the first and the second battery module. The first and the second housing have coolant inlet openings on respective opposite end sides in a second direction (Y) arranged orthogonally to the first direction (X). In each case one coolant outlet opening is arranged in the center of the first or second housing with respect to the second direction (Y) and leads into the coolant channel.

14 Claims, 2 Drawing Sheets

Figure 1:
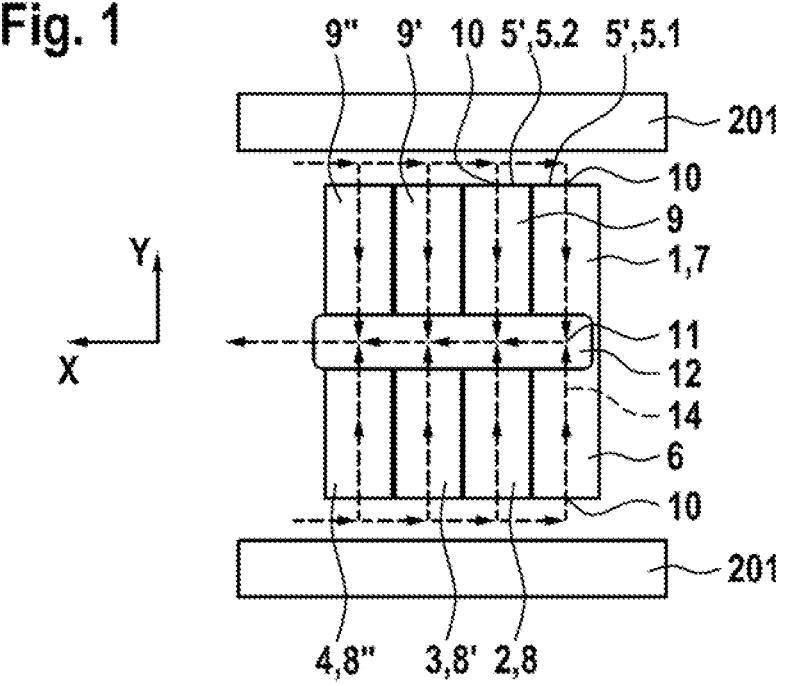

(51) Int. Cl.
  *H01M 10/625*    (2014.01)
  *H01M 10/6568*   (2014.01)
  *H01M 50/209*    (2021.01)
  *H01M 50/249*    (2021.01)
  *H01M 50/505*    (2021.01)
  *B60K 1/00*      (2006.01)
  *B60K 6/28*      (2007.10)
  *B60L 50/64*     (2019.01)

(52) U.S. Cl.
  CPC ..... *H01M 10/6568* (2015.04); *H01M 50/209* (2021.01); *H01M 50/249* (2021.01); *H01M 50/505* (2021.01); *B60K 1/00* (2013.01); *B60K 2001/005* (2013.01); *B60K 6/28* (2013.01); *B60L 50/64* (2019.02); *B60Y 2200/91* (2013.01); *B60Y 2200/92* (2013.01); *B60Y 2306/05* (2013.01); *B60Y 2400/112* (2013.01); *H01M 2220/20* (2013.01)

(56) References Cited

U.S. PATENT DOCUMENTS

2016/0276638 A1* 9/2016 Sham ................. H01M 50/249
2018/0034021 A1  2/2018 Yamamoto et al.

FOREIGN PATENT DOCUMENTS

| | | | |
|---|---|---|---|
| CN | 205248329 | U | 5/2016 |
| CN | 106711545 | A | 5/2017 |
| CN | 108232361 | A | 6/2018 |
| EP | 2991134 | A1 | 3/2016 |
| EP | 2991157 | A1 | 3/2016 |
| JP | 2010198930 | A | 9/2010 |
| JP | 2012129058 | A * | 7/2012 |
| JP | 2017091658 | A | 5/2017 |
| JP | 2020087522 | A | 6/2020 |

OTHER PUBLICATIONS

Preliminary French Search Report issued Jan. 15, 2025, by the Republic of France in corresponding French Application No. 2202553 and an English translation of the Preliminary French Search Report. (2 pages).

Office Action with Search Report issued Mar. 14, 2025, by the State Intellectual Property Office, P. R. China in corresponding Chinese Patent Application No. 202210377930.3 and an English translation of the Office Action. (20 pages).

* cited by examiner

BATTERY DEVICE FOR A MOTOR VEHICLE, MOTOR VEHICLE AND METHOD FOR OPERATING A BATTERY DEVICE

CROSS-REFERENCE TO RELATED APPLICATION

This application claims priority to German Patent Application No. 10 2021 109 353.8, filed Apr. 14, 2021, the content of such application being incorporated by reference herein in its entirety.

FIELD OF THE INVENTION

The present invention relates to a battery device for a motor vehicle, having a first battery module with a first housing, a second battery module which is arranged next to the first battery module in a first direction with a second housing, a coolant channel, and a battery module connector arranged in the coolant channel for electrically contacting the first and the second battery module and to a motor vehicle. The invention further relates to a method for operating a battery device of this type.

BACKGROUND OF THE INVENTION

Battery devices for motor vehicles, in particular battery devices for providing electrical energy for a traction drive of the motor vehicle, generate heat during the operation of the motor vehicle. This heat has to be removed in order to achieve a relatively long service life of the battery device. Liquid cooling systems have proven highly effective here. Typically, thermal contacts which are attached thermally to the battery cells, for example via a heat-conducting paste, are acted upon with a liquid coolant. Alternatively or additionally, however, the battery modules or battery cells can also be acted upon directly with a liquid and electrically non-conductive coolant, which provides a significantly greater cooling power.

Battery devices are conventionally constructed from a plurality of battery modules which, in turn, comprise at least one battery cell stack with a plurality of battery cells. The battery modules are electrically connected by means of a battery module connector, and therefore all of the battery modules can be charged and discharged via a common electrical connection of the battery device.

During the operation of the battery device, not only is waste heat produced at the battery cells, but also at the battery module connector, for example due to ohmic losses. This is also disadvantageous since the heat produced at the battery module connector can be transmitted by thermal conduction to the battery cells, and the ohmic resistance of the battery module connector is increased and the service life thereof reduced.

It is known from the prior art to cool the battery cells and the battery module connector. For example, the document CN 108 232 361 A, which is incorporated by reference herein, discloses a battery device for a motor vehicle, in which coolant is conducted through a coolant channel, in which a busbar is arranged, to the battery modules and is conducted away again. In this case, the battery modules and the busbar electrically connecting the battery modules are cooled.

A disadvantage of this is that it is not taken into consideration that the battery modules require a greater cooling power than the busbar. Cooling the battery modules with the coolant that has already been heated by the busbar is inefficient.

SUMMARY OF THE INVENTION

Described herein is a battery device which does not have the aforementioned disadvantages of the prior art, but rather permits highly efficient cooling of the battery device, in which the requirements of the components of the battery device are taken into consideration in the available cooling power.

A battery device for a motor vehicle has a first battery module with a first housing, a second battery module which is arranged next to the first battery module in a first direction with a second housing, a coolant channel, and a battery module connector arranged in the coolant channel for electrically contacting the first and the second battery module, wherein the first and the second housing have coolant inlet openings on respective opposite end sides in a second direction arranged orthogonally to the first direction and in each case one coolant outlet opening which is arranged in the center of the first or second housing with respect to the second direction and leads into the coolant channel.

In the case of the battery device according to aspects of the invention, a coolant is supplied laterally via the end walls to the battery modules. Since the coolant inlet openings are located on two opposite end sides of a housing, the end sides are outer sides. From the outer sides of the battery modules, the coolant can flow through the battery modules to the center, can cool the battery modules and can subsequently be conducted through the centrally arranged coolant outlet openings to the battery module connector. The coolant therefore firstly cools the battery module and then the battery module connector such that an optimally temperature-controlled coolant is provided to the battery modules. Since this applies both to the first and to the second battery module, they have the same requirements, and therefore the cooling power does not decrease from the first to the second battery module due to an intermediate cooling of the battery module connector.

It is conceivable for the battery device to comprise further battery modules which have the same features as the first and/or the second battery module. It is conceivable for the first and/or the second housing and/or the coolant channel to be produced from a plastic, in particular from an electrically insulating plastic. However, it is also conceivable for the first and/or the second housing and/or the coolant channel to have a structure made from a metal, in particular from aluminum. For this purpose, it is conceivable for the first and/or the second housing and/or the coolant channel to have a further structure for electrically insulating the first and/or the second housing and/or the coolant channel. For example, it is conceivable for this purpose for the first and/or the second housing and/or the coolant channel to have a sandwich structure made from a metal and an insulating material, for example a plastic.

Advantageous refinements and developments of the invention can be gathered from the dependent claims, and from the description with reference to the drawings.

According to a preferred embodiment of the invention, it is provided that the coolant channel has a main direction of extent along the first direction. The coolant channel thereby advantageously extends centrally along the battery modules which are arranged one behind another—with respect to the main direction of extent of the coolant channel. By means of the electrical contacting of the battery modules with the battery module connector, a mechanical connection of the battery modules to one another is preferably also produced, which leads to a significant increase in the mechanical stability of the battery device.

According to a further preferred embodiment of the invention, it is provided that the end sides are mechanically reinforced, wherein the end sides are preferably thicker than the other sides of the housings and/or have stiffening ribs and/or are manufactured from a stiffer material than the other sides of the housings. The effect thereby advantageously achieved is that the battery device can absorb kinetic energy admitted in the event of an accident and can conduct away and dissipate same in a targeted manner. If the coolant channel is arranged along the direction of travel, this applies in particular for a side impact.

According to a further preferred embodiment of the invention, it is provided that the battery module connector has a busbar, wherein the busbar is preferably arranged along the first direction. By this means, a stable electrical connection of the battery modules is possible with low ohmic losses. The busbar is preferably manufactured from copper or aluminum or a metal alloy which comprises copper and/or aluminum.

According to a further preferred embodiment of the invention, it is provided that the first battery module has a first battery cell stack and a further first battery cell stack, wherein the first and the further first battery cell stack are arranged next to each other in the first housing with respect to the second direction, wherein the second battery module has a second battery cell stack and a further second battery cell stack, wherein the second and the further second battery cell stack are arranged next to each other in the second housing with respect to the second direction. This advantageously results in the possibility of arranging a respective battery cell stack on the left and on the right of the centrally arranged coolant channel.

According to a further preferred embodiment of the invention, it is provided that a coolant section for conducting coolant along the second direction is arranged on a lower side of the first, of the further first, of the second and of the further second battery cell stack and on an upper side, which is opposite the lower side, of the first, of the further first, of the second and of the further second battery cell stack. It is thereby advantageously possible for the coolant to be conducted in a targeted manner along the upper side and the lower side of the battery cell stacks and to cool the latter. It is preferably provided that the coolant acts directly upon the upper and lower sides. For this purpose, it is preferably provided that the coolant is a dielectric coolant, in particular an oil. However, it is also conceivable for heat-conducting elements which are thermally connected to the battery cells to be arranged on the upper side and the lower side of the battery cell stacks. It is conceivable, for example, that the heat-conducting elements have a fin-pin structure and/or a rib structure. It is conceivable for the heat-conducting elements to be dielectric.

According to a further preferred embodiment of the invention, it is provided that further coolant sections for conducting coolant along the second direction are arranged between battery cells of the first, of the further first, of the second and of the further second battery cell stack. Highly effective cooling is produced by the use of a plurality of, preferably parallel, further coolant sections along the second direction. For this purpose, the battery cells are stacked above one another along a third direction orthogonal to the first direction and to the second direction. The further coolant sections are preferably provided between all the battery cells of a battery cell stack.

According to a further preferred embodiment of the invention, it is provided that further coolant sections for conducting coolant along a third direction orthogonal to the first direction and to the second direction are arranged between battery cells of the first, of the further first, of the second and of the further second battery cell stack. Highly effective cooling is likewise produced by the use of a plurality of, preferably parallel, further coolant sections along the third direction. For this purpose, the battery cells are stacked next to one another or lined up in a row along the first direction or along the second direction. The further coolant sections are preferably provided between all the battery cells of a battery cell stack. It is conceivable for the coolant sections and the further coolant sections to be designed in such a manner that the coolant is conducted in a meandering manner through the battery cell stacks.

According to a further preferred embodiment of the invention, it is provided that a closure element for liquid-tightly closing the coolant section is arranged in the coolant section on the upper side on an outer side, facing the end side, of the first, of the further first, of the second and of the further second battery cell stack and on the lower side on an inner side opposite the outer side, or in that a closure element for fluid-tightly closing the coolant section is arranged in the coolant section on the lower side on the outer side of the first, of the further first, of the second and of the further second battery cell stack and on the upper side of the inner side. By this means, the coolant is forced on a longer path along the battery cell stacks. A direct flow along the coolant section to the coolant outlet opening without flowing through the further coolant sections is thus prevented. Coolant heated in the further coolant sections is likewise prevented from flowing back to the coolant inlet opening and therefore coolant which has already been heated is prevented from flowing through the battery cell stack again.

According to a further preferred embodiment of the invention, it is provided that the coolant channel is arranged on an upper side and outside an interior space of the first and the second housing, preferably welded, adhesively bonded and/or screwed thereto, wherein one part of the battery module connector is preferably arranged in the interior space and one part of the battery module connector is preferably arranged in the coolant channel, wherein the busbar is particularly preferably arranged in the coolant channel. A spatial separation of the cooling of battery cell stack and busbar is thereby advantageously realized. Furthermore, the installation of the battery device through the coolant channel available at the top is significantly simplified.

The present invention furthermore relates to a motor vehicle having a battery device according to aspects of the invention. The battery device is preferably a battery device for supplying a traction drive of the motor vehicle with electrical energy. The motor vehicle is preferably a partially electrically operated motor vehicle, i.e. what is referred to as a hybrid vehicle having an electric drive engine and combustion engine, or a fully electrically operated motor vehicle. For this purpose, it is preferably provided that the first direction is arranged along a longitudinal axis of the motor vehicle and the second direction is arranged along a transverse axis of the motor vehicle.

According to a further preferred embodiment of the invention, it is provided that the end sides are arranged facing sills of the motor vehicle. The battery device preferably extends from one sill to the other sill. Sills within the meaning of the present invention are side sills of the body of the motor vehicle. This is advantageously a good use of space.

The invention furthermore relates to a method for operating a battery device for a motor vehicle, having a first battery module with a first housing, a second battery module which is arranged next to the first battery module in a first direction with a second housing, a coolant channel, and a battery module connector arranged in the coolant channel for electrically contacting the first and the second battery module, wherein the first and the second housing have coolant inlet openings on respective opposite end sides in a second direction arranged orthogonally to the first direction, through which a coolant flows into the respective housing, and wherein the first and the second housing (5.1, 5.2) each have a coolant outlet opening (11) which is arranged in the center of the first or second housing (5.1, 5.2) with respect to the second direction (Y), leads into the coolant channel (12) and through which the coolant flows out of the respective housing (5.1, 5.2).

The advantages described in conjunction with the battery device are also achieved in the vehicle and in the method for operating a battery device.

It is preferably provided that the battery device is a battery device according to aspects of the invention.

All of the details, features and advantages disclosed previously in conjunction with the battery device according to aspects of the invention likewise relate to the motor vehicle according to aspects of the invention and to the method according to aspects of the invention.

BRIEF DESCRIPTION OF THE DRAWING FIGURES

Further details, features and advantages of the invention emerge from the drawings and from the description below of preferred embodiments with reference to the drawings. The drawings merely illustrate exemplary embodiments of the invention that do not restrict the inventive concept.

FIG. 1 schematically illustrates a battery device according to an exemplary embodiment of the present invention.

Figure 2:
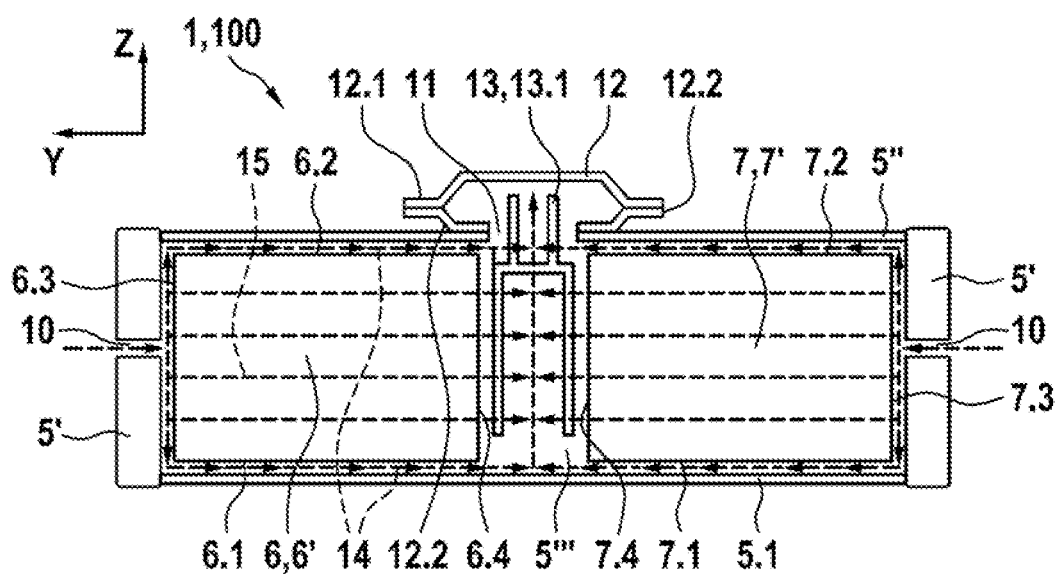

FIG. 2 schematically illustrates a battery device according to an exemplary embodiment of the present invention.

Figure 3:
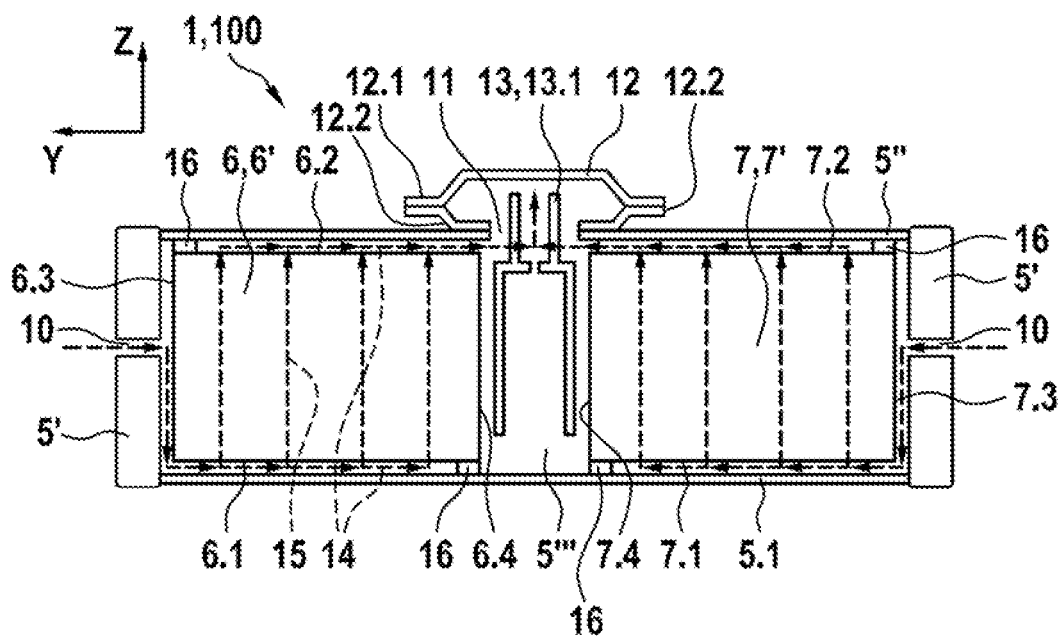

FIG. 3 schematically illustrates a battery device according to an exemplary embodiment of the present invention.

Figure 4:
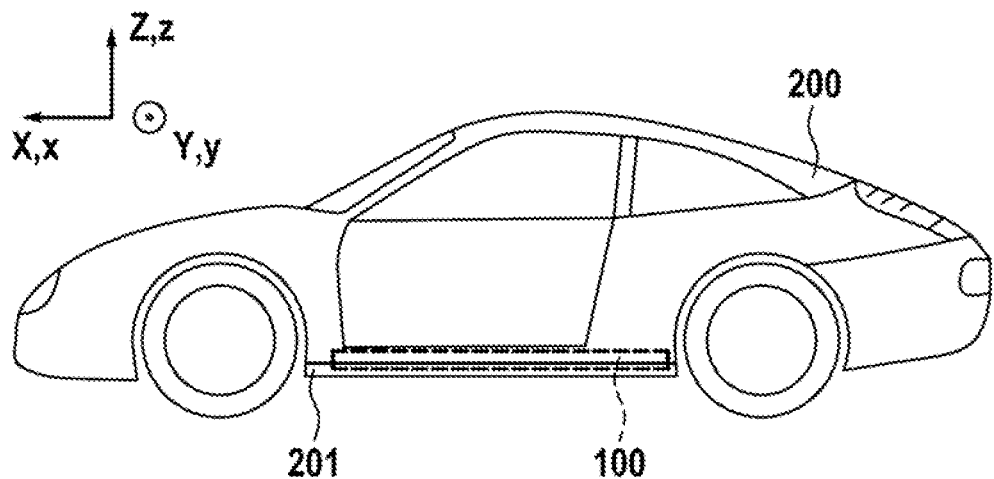

FIG. 4 schematically illustrates a motor vehicle according to an exemplary embodiment of the present invention.

DETAILED DESCRIPTION OF THE INVENTION

FIG. 1 schematically illustrates a battery device 100 according to an exemplary embodiment of the present invention looking along a third direction (see FIG. 1), here from above. A first battery module 1, a second battery module 2, a third battery module 3 and a fourth battery module 4 can be seen. The battery modules 1, 2, 3, 4 are arranged next to one another in a first direction X which is oriented orthogonally to the third direction. The battery device 100 is a battery device 100 for a motor vehicle (see FIG. 4). In a second direction Y orthogonal to the first direction X and to the third direction, sills 201 of the motor vehicle are arranged next to the battery modules 1, 2, 3, 4. The battery modules 1, 2, 3, 4 have housings. A first housing 5.1 of the first battery module 1 and a second housing 5.2 of the second battery module 2 are denoted here.

A first battery cell stack 6 and a further first battery cell stack 7 of the first battery module 6, a second battery cell stack 8 and a further second battery cell stack 9 of the second battery module 2, a third battery cell stack 8' and a further third battery cell stack 9' of the third battery module 3 and a fourth battery cell stack 8" and a further fourth battery cell stack 9" of the fourth battery module 4 are arranged in the housings 5.1, 5.2 of the battery modules 1, 2, 3, 4.

For the cooling of the battery cell stack 6, 7, 8, 8', 8", 9, 9', 9", end sides 5' of the housings 5.1, 5.2 facing the sills 201 have cooling inlet openings 10. For the sake of clarity, the coolant inlet openings 10 are denoted only at two locations in FIG. 1, but are found on both end sides 5' of all the battery modules 1, 2, 3, 4. A coolant, preferably a dielectric coolant, flows through the coolant inlet openings 10 into the housings 5.1, 5.2 and acts upon the battery cell stacks 6, 7, 8, 8', 8", 9, 9', 9". The flow path of the coolant is illustrated here by dashed arrows.

From the end sides 5.1, the coolant flows through coolant sections 14 toward the center where the coolant flows through coolant outlet openings 11 into a coolant channel 12. For the sake of clarity, the coolant sections 14 and the coolant outlet openings 11 are denoted only once here, but are found on each of the battery modules 1, 2, 3, 4.

The coolant channel 12 collects the coolant heated by the battery cell stacks 6, 7, 8, 8', 8", 9, 9', 9" and carries said coolant forward along the first direction X. A battery module connector (see FIGS. 2 and 3) which is likewise cooled by this means is arranged in the coolant channel 12.

FIG. 2 schematically illustrates a battery device 100 according to an exemplary embodiment of the present invention. The battery device 100 from FIG. 1 is illustrated here looking along the first direction, i.e. from the front. The first battery module 1 with the first housing 5.1, the end walls 5', the lateral coolant inlet openings 10, the first battery cell stack 6, the further first battery cell stack 7 and the coolant paths, which are again illustrated as dashed arrows, can likewise be seen here. The second battery module cannot be seen here for reasons of perspective.

It can readily be seen here how the coolant enters through the coolant inlet openings 10 on the end sides 5' into the first housing 5.1 and flows around battery cells 6', 7' of the first and of the further first battery cell stack 6, 7 and in the process cools them. From the coolant inlet openings 10, the coolant first of all flows along the third direction Z, here upward and downward, past the outer sides 6.3, 7.3, facing the end sides 5', of the first and second battery cell stack 6, 7, the coolant being divided between the coolant sections 14 along the lower sides 6.1, 7.1 and the upper sides 6.2, 7.2 of the first and second battery cell stack 6, 7 and further coolant sections 15 along the second direction Y, here along the horizontal, toward the center, between individual battery cells 6', 7' of the first and second battery cell stack 6, 7. The battery cells 6', 7' are stacked one above another along the third direction Z.

In the center of the first housing 5.1, the coolant now first of all flows around part of the battery module connector 13 in the interior space 5''' of the first housing 5.1 and is then conducted along the inner sides 6.4, 7.5 of the first and second battery cell stack 6, 7 through the coolant outlet opening 11 into the coolant channel 12 arranged on the upper side 5" of the first housing 5.1.

A busbar 13.1 of the battery module connector 13, which is likewise cooled by the coolant, is arranged in the coolant channel 12.

Although the second, the third and the fourth battery module 2, 3, 4 cannot be seen here, the coolant flow in these battery modules 2, 3, 4 is guided entirely analogously to that shown here.

Both the coolant channel 12 and the first housing 5.1 are electrically insulated. The end walls 5' are noticeably significantly thicker than the other walls of the first housing 5.1. By this means, in the event of an accident, energy can be absorbed and conducted away.

As can likewise be seen here, the coolant channel 12 is in multiple parts. On the left and on the right of the coolant outlet opening 11, two lower parts 12.2 are connected fluid-tightly to the first housing 5.1. An upper part 12.1 which is likewise connected fluid-tightly to the lower parts 12.2 is arranged on the two lower parts 12.2. The coolant channel 12 is adhesively bonded or welded here onto the first housing 5.1.

FIG. 3 schematically illustrates a battery device 100 according to an exemplary embodiment of the present invention. The embodiment shown here of the battery device 100 is similar to that shown in FIG. 2 with the difference that here the battery cells 6', 7' of the first battery module 1 are lined up in a row next to one another along the second direction Y. On entering through the coolant inlet openings 10 in the end sides 5' of the first housing 5.1, the coolant (illustrated by dashed arrows) first of all flows into the interior space 5''' of the first housing 5.1 to the lower sides 6.1, 7.1 of the first and second battery cell stack 6, 7 where it is divided in the coolant sections 14 along the lower sides 6.1, 7.1 between further coolant sections 15 and flows along the third direction Z to the upper sides 6.2, 7.2 of the first and second battery cell stack 6, 7. Along the upper sides 6.2, 7.2, the coolant is then conducted through the coolant section 14 to the center through the coolant outlet opening 10 into the cooling channel 12.

In order to have the effect that the coolant flows through the further coolant sections 14 and not merely along the outer side 6.3, 7.3 or the inner sides 6.4, 7.4 of the battery cell stack 6, 7 past the coolant sections 14, the battery device 100 has fluid-tight closure elements 16.

Alternatively to the embodiment shown here, by using the closure element 16, the coolant would also initially be able to flow upward along the outer sides 6.3, 7.3, back downward through the further coolant section 14 and finally upward again on the inner sides 6.4, 7.4 to the coolant outlet opening 11. It is also conceivable for closure elements to be arranged such that the coolant meanders between the battery cells 6', 7', i.e. upward and downward in an alternating manner.

Also seen here, as in the exemplary embodiment shown in FIG. 2, is the battery module connector 13 with the busbar 13.1 and the multi-part structure of the coolant channel 12 with the lower parts 12.2 and the upper part 12.1.

Although the second, the third and the fourth battery module 2, 3, 4 cannot be seen here, the coolant flow is guided in these battery modules 2, 3, 4 entirely analogously to that shown here.

FIG. 4 schematically illustrates a motor vehicle 200 according to an exemplary embodiment of the present invention. The motor vehicle 200 has a battery device 100 according to an exemplary embodiment of the present invention. A sill 201 of the motor vehicle 200 can be seen. Also shown are the first direction X, which corresponds to a longitudinal axis x of the motor vehicle 200, the second direction Y, which corresponds to a transverse axis y of the motor vehicle 200, and the third direction Z, which corresponds to a vertical axis z of the motor vehicle 200.

LIST OF REFERENCE SIGNS 1 first battery module
2 second battery module
3 third battery module
4 fourth battery module
5.1 first housing
5.2 second housing
5' end side
5" upper side
5''' interior space
6 first battery cell stack
6.1 lower side of the first battery cell stack
6.2 upper side of the first battery cell stack
6.3 outer side of the first battery cell stack
6.4 inner side of the first battery cell stack
7 further first battery cell stack
7.1 lower side of the further first battery cell stack
7.2 upper side of the further first battery cell stack
7.3 outer side of the further first battery cell stack
7.4 inner side of the further first battery cell stack
8 second battery cell stack
8' third battery cell stack
8" fourth battery cell stack
9 further second battery cell stack
9' further third battery cell stack
9" further fourth battery cell stack
10 coolant inlet opening
11 coolant outlet opening
12 coolant channel
12.1 upper part
12.2 lower part
13 battery module connector
13.1 busbar
14 coolant section
15 further coolant section
16 closure element
200 motor vehicle
201 sill
x longitudinal axis
X first direction
y transverse axis
Y second direction
z vertical axis
Z third direction

What is claimed:

1. A battery device for a motor vehicle, said battery device comprising:
   a first battery module having a first housing,
   a second battery module having a second housing, the second battery module being arranged next to the first battery module as viewed in a first direction (X),
   a coolant channel, and
   a battery module connector arranged in the coolant channel for electrically contacting the first and the second battery module,
   wherein the first and the second housings each have coolant inlet openings on respective opposite end sides thereof as viewed in a second direction (Y) that is arranged orthogonally to the first direction (X),
   wherein the first and the second housings each have one coolant outlet opening which is arranged in a center region with respect to the second direction (Y), wherein the coolant outlet opening leads into the coolant channel.

2. The battery device as claimed in claim 1, wherein the coolant channel has a main direction of extent along the first direction (X).

3. The battery device as claimed in claim 1, wherein, for each housing, the end sides are (i) thicker than other sides and/or (ii) have stiffening ribs and/or (iii) are manufactured from a stiffer material than the other sides.

4. The battery device as claimed in claim 1, wherein the battery module connector has a busbar, that is arranged along the first direction (X).

5. The battery device as claimed in claim 1, wherein the first battery module has a first battery cell stack and a further first battery cell stack, wherein the first and the further first battery cell stack are arranged next to each other in the first housing with respect to the second direction (Y), and
wherein the second battery module has a second battery cell stack and a further second battery cell stack, wherein the second and the further second battery cell stack are arranged next to each other in the second housing with respect to the second direction (Y).

6. The battery device as claimed in claim 5, wherein a coolant section for conducting coolant along the second direction (Y) is arranged on a lower side of each of the first, of the further first, of the second and of the further second battery cell stacks and on an upper side, which is opposite the lower side, of each of the first, of the further first, of the second and of the further second battery cell stacks.

7. The battery device as claimed in claim 6, further comprising further coolant sections for conducting coolant along the second direction (Y), said further coolant sections being arranged between battery cells of the first, of the further first, of the second and of the further second battery cell stacks.

8. The battery device as claimed in claim 6, further comprising further coolant sections for conducting coolant along a third direction (Z) that is orthogonal to both the first direction (X) and to the second direction (Y), said further coolant sections being arranged between battery cells of the first, of the further first, of the second and of the further second battery cell stacks.

9. The battery device as claimed in claim 6, for each of the first, of the further first, of the second and of the further second battery cell stacks, the battery device further comprises a first closure element that blocks one side of the upper side coolant section and a second closure element that blocks one side of the lower side coolant section, wherein the first and second closure elements are positioned at opposite corners of the respective battery cell stack.

10. The battery device as claimed in claim 6, for each of the first, of the further first, of the second and of the further second battery cell stacks, the battery device further comprises a first closure element that blocks one side of the upper side coolant section and a second closure element that blocks one side of the lower side coolant section.

11. The battery device as claimed in claim 1, wherein the coolant channel is arranged on an upper side and outside of an interior space of each of the first housing and the second housing,
wherein, for each of the first housing and the second housing, one part of the battery module connector is arranged in the interior space of the respective housing and one part of the battery module connector is arranged in the coolant channel,
wherein a busbar of the battery module connector is arranged in the coolant channel.

12. A motor vehicle having the battery device as claimed in claim 1.

13. The motor vehicle as claimed in claim 12, wherein the first direction (X) is arranged along a longitudinal axis (x) of the motor vehicle and the second direction (Y) is arranged along a transverse axis (y) of the motor vehicle.

14. The motor vehicle as claimed in claim 13, wherein the end sides are arranged facing sills of the motor vehicle.

* * * * *